United States Patent
Beiter (10) Patent No.: US 10,708,253 B2
(45) Date of Patent: Jul. 7, 2020

(54) IDENTITY INFORMATION INCLUDING A SCHEMALESS PORTION

(71) Applicant: Hewlett-Packard Development Company, L.P., Houston, TX (US)

(72) Inventor: Michael B Beiter, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 112 days.

(21) Appl. No.: 15/112,389

(22) PCT Filed: Jan. 20, 2014

(86) PCT No.: PCT/US2014/012175
§ 371 (c)(1),
(2) Date: Jul. 18, 2016

(87) PCT Pub. No.: WO2015/108537
PCT Pub. Date: Jul. 23, 2015

(65) Prior Publication Data
US 2016/0337337 A1    Nov. 17, 2016

(51) Int. Cl.
*H04L 29/06*    (2006.01)
*G06F 21/41*    (2013.01)

(52) U.S. Cl.
CPC .......... *H04L 63/0815* (2013.01); *G06F 21/41* (2013.01)

(58) Field of Classification Search
CPC ............................ H04L 63/0815; G06F 21/41
USPC ............................................................ 726/4
See application file for complete search history.

(56) References Cited

U.S. PATENT DOCUMENTS

| 6,397,125 | B1 | 5/2002 | Goldring et al. |
|---|---|---|---|
| 7,630,974 | B2 | 12/2009 | Remahl et al. |
| 7,970,791 | B2 | 6/2011 | Liao et al. |
| 7,996,883 | B2 | 8/2011 | Chin et al. |
| 8,132,231 | B2 | 3/2012 | Amies et al. |
| 8,434,129 | B2 | 4/2013 | Kannappan et al. |
| 8,447,829 | B1 | 5/2013 | Geller et al. |
| 8,555,055 | B2 | 10/2013 | Grebenik et al. |
| 8,862,588 | B1 * | 10/2014 | Gay ................. G06F 17/30336 707/741 |

(Continued)

FOREIGN PATENT DOCUMENTS

WO    WO-2003098483 A1    11/2003

OTHER PUBLICATIONS

Gigya, "Accounts API ~ Gigya's Documentation," (Webpage), retrieved on Dec. 18, 2013, 7 pages.

(Continued)

*Primary Examiner* — Eleni A Shiferaw
*Assistant Examiner* — Angela R Holmes
(74) *Attorney, Agent, or Firm* — Trop Pruner & Hu PC (57) ABSTRACT

In response to a request of a first user, identity information for users is searched to retrieve a portion of the identity information corresponding to the first user. The identity information including fields, where a first subset of the fields is schemaless, and a second subset of the fields is interpreted according to a specified schema. Searching the identity information includes searching the first subset and the second subset of fields. An action for the request is authorized by using information included in at least one field of the first subset included in the retrieved portion of the identity information.

14 Claims, 7 Drawing Sheets

(56) References Cited

U.S. PATENT DOCUMENTS

| | | |
|---|---|---|
| 2004/0243822 A1 | 12/2004 | Buchholz et al. |
| 2008/0189617 A1 | 8/2008 | Covell et al. |
| 2010/0083092 A1* | 4/2010 | Schuller ................ G06F 17/246 |
| | | 715/227 |
| 2010/0306393 A1 | 12/2010 | Appiah et al. |
| 2011/0126275 A1 | 5/2011 | Anderson et al. |
| 2011/0225167 A1 | 9/2011 | Bhattacharjee et al. |
| 2011/0231899 A1 | 9/2011 | Pulier et al. |
| 2012/0136936 A1 | 5/2012 | Quintuna |
| 2012/0143951 A1 | 6/2012 | Hacigumus et al. |
| 2012/0151568 A1 | 6/2012 | Pieczul et al. |
| 2012/0173725 A1 | 7/2012 | Verma |
| 2012/0179646 A1 | 7/2012 | Hinton et al. |
| 2012/0191760 A1 | 7/2012 | Kaufman et al. |
| 2012/0233522 A1 | 9/2012 | Barton et al. |
| 2013/0019276 A1 | 1/2013 | Biazetti et al. |
| 2013/0041872 A1 | 2/2013 | Aizman et al. |
| 2013/0060839 A1 | 3/2013 | Van Biljon et al. |
| 2013/0091171 A1 | 4/2013 | Lee |
| 2013/0139172 A1 | 5/2013 | An et al. |
| 2013/0144945 A1 | 6/2013 | Said et al. |
| 2013/0185431 A1 | 7/2013 | Venkatesh et al. |
| 2013/0185436 A1 | 7/2013 | Carlin et al. |
| 2013/0227560 A1 | 8/2013 | McGrath et al. |
| 2013/0227658 A1 | 8/2013 | Leicher et al. |
| 2013/0254539 A1 | 9/2013 | Auradkar et al. |
| 2013/0275379 A1 | 10/2013 | Trebas et al. |

OTHER PUBLICATIONS

Gigya, "Identity Storage ~ Gigya's Documentation," (Webpage) retrieved on Dec. 18, 2013, 5 pages.

Gigya, "Identity Storage," (Webpage), retrieved on Dec. 18, 2013, 3 pages.

Gigya, User Management 360, Gigya's Documentation retrieved on Dec. 18, 2013, 5 pages.

Hitachi ID Systems Inc., "Privileged Access Manager Product Q&A," (Web Page), Dec. 14, 2011, 10 pages ~ http://hitachi-id.com/

IBM, "IBM Lotus Domino 8.5 Administrator Versions 8.5 and 8.5.1, How replication works in a cluster" (Web Page), Oct. 5, 2009, 2 pages ~ http://publib.boulder.ibm.com/

Identropy, "Smart Identity Management," (Web Page), Jan. 9, 2013, 2 pages, available at http://www.identropy.com/smart-idm/.

Netiq, "Lightning-fast administration for greater agility,"(Web Page), Oct. 15, 2010, 2 pages ~ https://www.netiq.com/

Oracle, "Data Replication," Oracle Solaris Cluster Geographic Edition Overview, Solaris Cluster 4.0, available online Nov. 3, 2013, <http://docs.oracle.com/

Sample, N. et al, "Indexing Open Schemas," (Research Paper), Jun. 15, 2002, 13 pages ~ http://infolab.stanford.edu/.

Shi, K. et al., "Zone-Based Replication Scheme for Mobile Ad Hoc Networks Using Cross-Layer Design," (Web Page), 2006, pp. 698-710 ~ http://link.springer.com/.

VCE Company, "Vblock™ Solution for Trusted Multi-Tenancy: Design Guide," (Research Paper), Mar. 20, 2013, 143 pages ~ http://www.vce.com/.

* cited by examiner

IDENTITY INFORMATION INCLUDING A SCHEMALESS PORTION

BACKGROUND

A cloud system includes resources or services that can be shared by customers of a provider of the cloud system. Resources can include processing resources, storage resources, communication resources, and so forth. Services can be provided by applications or other machine-executable instructions. The cloud system allows its resources or services to be accessed by customers on-demand.

BRIEF DESCRIPTION OF THE DRAWINGS

Some implementations are described with respect to the following figures.

DETAILED DESCRIPTION

The infrastructure of a cloud system can be owned by or managed by a provider, which can be an entity such as a business concern, government agency, educational organization, or individual. The infrastructure of the cloud system can be located at a particular geographic site, or can be distributed across multiple geographic sites. The infrastructure includes cloud resources and cloud services that are made available to customers of the provider. Such customers, which are also referred to as tenants, can be located anywhere, so long as they are able to access the cloud system over a network. A tenant can refer to an individual user or a collection of users, such as users who are members of a business concern, a government agency, or an educational organization.

Cloud resources can include any one or some combination of the following: processing resources (which can include processors of one or multiple computers), storage resources (which can include storage devices such as disk-based storage devices or solid state storage devices), communication resources (which can include communication devices to allow communications by users, where examples of communication devices can include routers, switches, communication establishment servers, etc.), and other resources.

In addition to cloud resources, the cloud system can also provide cloud services, such as web services, that can be invoked by users of tenants of the cloud system. A user of a tenant can refer to a machine or a human. A cloud service refers to a functionality that can be invoked by a tenant. The functionality can be provided by a respective application or other machine-readable instructions. A web service refers to a service that is accessible over a network, such as the Internet.

Although reference is made to a cloud system in the present discussion, is noted that techniques or mechanisms according to some implementations are also applicable to other types of systems that can include resources and/or services that can be shared by multiple tenants.

A cloud system can include an identity management system that stores information to enable authentication of users attempting to access the cloud system, and authorization of access to requested resources or services of the cloud system. Other entities can interact with the identity management system to perform the authorization and authentication. The identity management system can define privileges relating to the access of the resources and services of the cloud system. A privilege can refer to the permission of a given user to perform an action, which can involve accessing a resource or service of the cloud system.

The identity management system also provides privileges associated with the ability to create, read, update, or delete profile information of users. The profile information of a user maintained by the identity management system can include various types of user data, including a users name, email address, login name (for logging into the cloud system), one or multiple authentication credentials that allow a user to access the cloud system (examples of an authentication credential can include a password, biometric information of the user, a secure key, and so forth), and so forth. The profile information of a user can include a public portion (which is known to other users) and a private portion (which is known only to the user and possibly an administrator). For example, the public portion of the profile information can include the name of the user that is publically displayed, the user's email address, and so forth. Examples of the private information of the user can include a login name, authentication credential, and so forth.

A "multi-tenant" identity management system is an identity management system that is able to perform identity management for multiple tenants, such as multiple tenants of a cloud system.

Information stored by the identity management system can be referred to as identity information. Generally, "identity information" can refer to any portion or all of the information stored by an identity management system that is used by the identity management system to perform authentication of users and to determine whether an access of a requested resource or service is authorized. The identity information can also store other user profile information such as a phone number, an e-mail address, and so forth, which can be used for performing other tasks aside from authentication and authorization.

Traditionally, an identity management system stores identity information in a database that is according to a specified schema. A schema refers to a defined organization of data. A database according to a specific schema stores data according to the organization defined by the schema. The schema can specify the fields of the data that are to be stored in the database. For example, a schema can specify that each row of the database is to include the following fields also referred to as attributes): user name, user identifier, password, organization that the user is part of, and so forth. Data stored in the database for each user would include the foregoing fields.

By storing identity information in a database according to a specified schema, flexibility is reduced since it may be difficult to add new fields, modify existing fields, or delete existing fields of the identity information. In some examples, it may be useful to add identity information of users of a third party into the identity information of an identity management system. The third party identity information may include additional fields that may not be present in the identity information of the identity management system. If the identity information of the identity management system is stored in a database according to a specified schema, then it may be challenging to add the third party identity information to the identity information of the identity management system.

In other examples, different systems may wish to share user identity information, where the sharing is performed through an identity management system. To exchange the shared user identity information through the identity management system, the shared user identity information can be appended to records of identity information of the identity management system. Appending information to records in the identity management systems involves dynamic extensions of the records, in which new fields are added. Such addition of new fields may not be easily performed if the identity information of the identity management system is stored in a database according to a specified schema.

In accordance with some implementations, identity information for an identity management system can be stored in a semi-schemaless data repository. As shown in an example arrangement of FIG. 1, an identity management system 102 includes a semi-schemaless identity information repository 104. The semi-schemaless identity information repository 104 includes a schemaful portion 106 and a schemaless portion 108.

Figure 1:
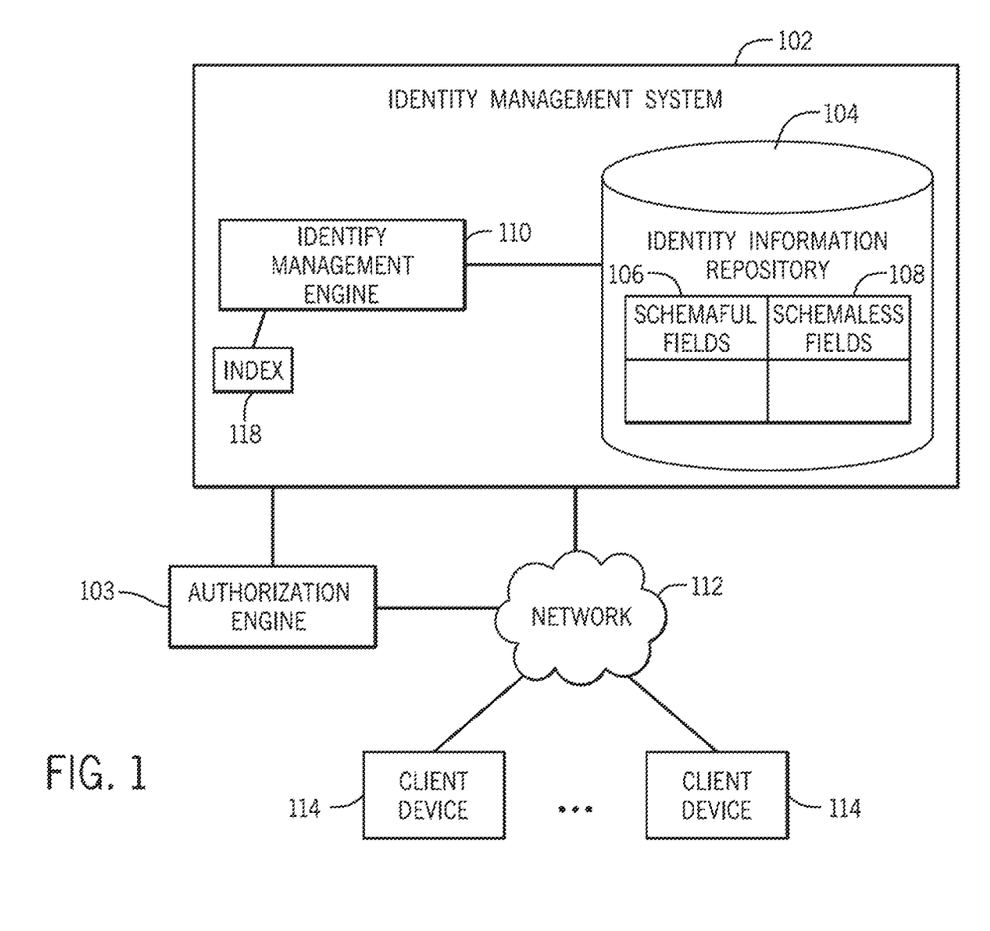
FIG. 1 is a block diagram of an example arrangement that includes an identity management system and client devices, in accordance with some implementations.

The schemaful portion 106 of the identity information repository 104 stores a portion of the identity information that is interpreted according to a specified schema. The schemaless portion 108 of the identity information repository 104 stores a portion of the identity information in a schemaless manner. The schemaful portion 106 includes one or multiple fields of identity information that are interpreted according to the specified schema. Interpreting a field for fields) according to a specified schema refers to checking for presence and/or determining consistency of the field(s) with the specified schema. The schemaless portion 108 includes one or multiple fields that are not according to any schema.

As further shown in FIG. 1, the identity management system 102 includes an identity management engine 110 that is able to access the identity information repository 104. The identity management system 102 is accessible over a network 112 in response to requests from client devices 114. The client devices 114 can be associated with various users, which can include users of one or multiple tenants that are customers of a cloud system that includes the identity management system 102, for example.

A request can be submitted by a client device 114 to request an action with respect to the cloud system that includes the identity management system 102. As noted above, a cloud system can include cloud resources and/or cloud services that are accessible by tenants of the cloud system. In response to the request to access a cloud resource or cloud service, the identity management engine 110 can search the identity information repository 104 to retrieve identity information corresponding to a user who submitted the request. The requested action can be authorized by an authorization engine 103 (e.g. a user sign-on engine) using the retrieved identity information, where the retrieved identity information can include information from the schemaful portion 106 and the schemaless portion 108. For example, the retrieved identity information can include a user name, a user password or other credential, permissions associated with the user, and other information. Note that engine 103 can additionally or alternatively be an authentication engine.

To increase the speed at which a search of the identity information repository 104 can be performed, the identity management engine 110 can build an index 118 based on content of the identity information repository 104. An index is a data structure that maps values of one or multiple fields of a database to corresponding locations identifying where database entries containing the values of the one or multiple fields are stored. For example, the index 118 can be defined on a user name field. Different user names can be mapped by the index 118 to respective different database entries containing identity information for the respective different user names.

In response to a request that identifies a particular user name the identity management engine 110 can use the particular user name to look up an entry of the index 118. The entry of the index 118 contains a location of the database entry (in the identity information repository 104) that contains the particular user name (along with other corresponding identity information). Performing a search of the identity information repository 104 using the index 118 can be accomplished more quickly than having to scan all entries of the identity information repository 104 in response to a request.

The index 118 can be defined on field(s) of the schemaful portion 10 and/or field(s) of the schemaless portion 108.

The authorization engine 103 and the identity management engine 110 may include any combination of hardware and programming to implement the functionalities of the engine. Such combinations of hardware and programming may be implemented in a number of different ways. For example, the programming for an engine may include executable instructions stored on a non-transitory machine-readable storage medium and the hardware for the engine may include processors) to execute those instructions. In such examples, the machine-readable storage medium may store instructions that, when executed by the processor(s), implement functionalities of the engine. The machine-readable storage medium storing the instructions may be integrated in a computing device including the processing resource to execute the instructions, or the machine-readable storage medium may be separate but accessible to the computing device and the processing resource. The processing resource may include one processor or multiple processors included in a single computing device or distributed across multiple computing devices. In other examples, the functionalities of any of the engines may be implemented in the form of electronic circuitry.

Figure 2:
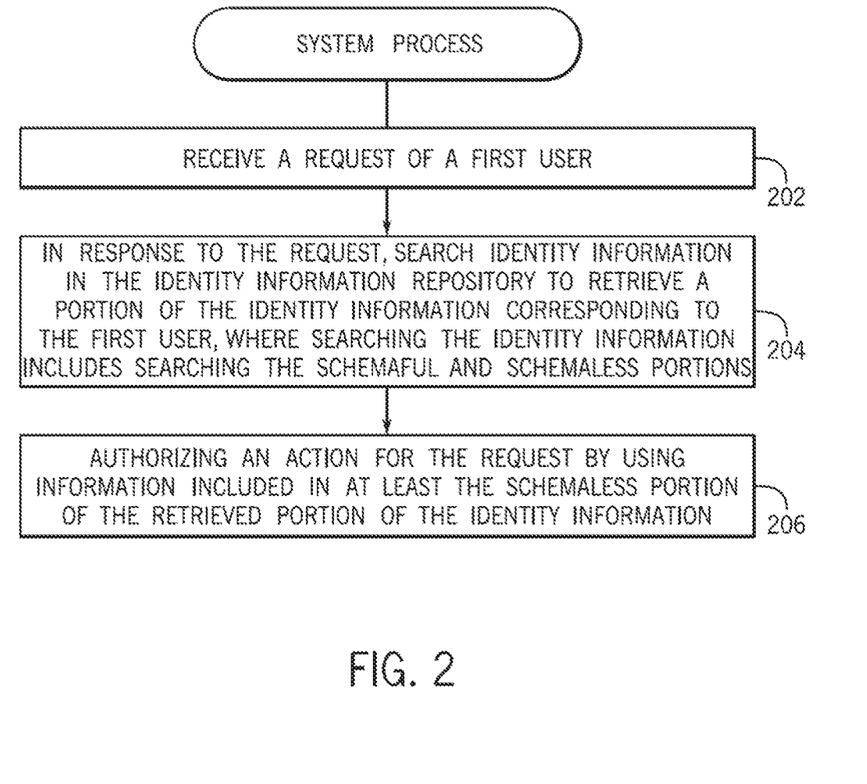
FIG. 2 is a flow diagram of a system process, according to some implementations.

FIG. 2 is a flow diagram of a system process according to some implementations, which can be performed by the identity management engine 110 and authorization engine 103 of FIG. 1. The identity management engine 110 receives (at 202) a request of a first user. This request can be received from a client device 114, as shown in FIG. 1.

In response to the request, the identity management engine 110 searches (at 204) the identity information repository 104 to retrieve a portion of the identity information corresponding to the first user. Searching the identity information repository 104 involves searching both the schemaful and schemaless portions 106 and 108 of the identity information repository 104.

The authorization engine 103 authorizes (at 206) an action for the request by using information that is part of at least the schemaless portion of the retrieved identity information. The authorizing can be based also on the schemaful portion of the retrieved identity information.

In addition to performing authorization, other actions can also be performed (such as by the authorization engine 103 or by another entity) using, the identity information stored in the schemaless and schemaful portions of the identity information repository 104. For example, such an action may include the sending of an e-mail to specific users, where the sending of such an e-mail uses the retrieved identity information.

By using semi-schemaless storage of identity information according to some implementations, new fields can be easily added to the identity information repository 104. At the same time, the presence of the schemaful portion 106 allows for enforcement of presence of certain core information, where examples of the core information can include the name or identity of the user, a password or credential of the user, and a status indicator for indicating whether the user is enabled or disabled.

If the core information were to be stored in a schemaless fashion, then it would be more difficult to determine whether the core information is present in the identity management system 102.

Moreover, if the identity management system 102 is a distributed system that has computer nodes distributed across different geographic zones, then replication of certain identity information between different zones may be possible, in which case there would be multiple copies of the replicated identity information. If core information is replicated, it is desirable that any modification of the core information be timely propagated throughout the identity management system 102. However, if the core information is stored in a schemaless fashion, then consistent replication may not be easily achievable. For example, if the status indicator of a given, user is modified from the enabled status to the disabled status in a first copy of the identity information, and the updated status indicator is not timely propagated to another replicated copy of the identity information, then the given user may be improperly granted access to a cloud resource or cloud service if a stale copy of the identity information for the given user is used by the identity management system 102 to determine whether access should be granted to the given user.

Figure 3:
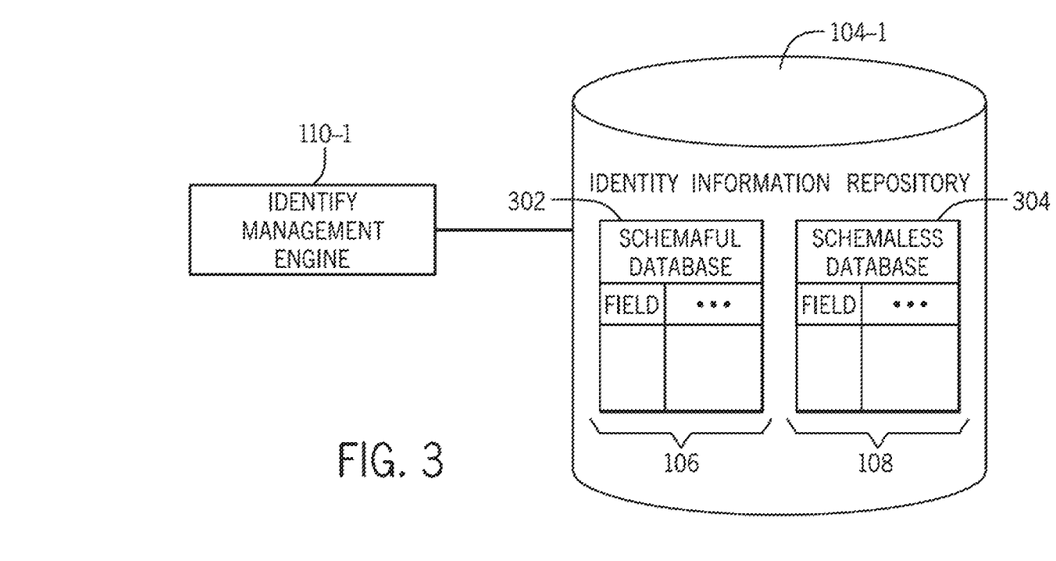
FIGS. 3-5 are schematic diagrams of example identity management systems that include identity information repositories that store semi-schemaless identity information, according to various implementations.

There are several possible ways of implementing the semi-schemaless identity information repository 104 and respective identity management, engine 110. FIG. 3 shows an identity management repository 104-1 that can be accessed by an identity management engine 110-1 according to some implementations. The identity management repository 104-1 of FIG. 3 includes a schemaful database 302 and a schemaless database 304 that is distinct from the schemaful database 302. Note that the schemaful database 302 and the schemaless database 304 may be stored on different storage devices, or may be stored on the same set of one or multiple storage devices.

The schemaful database 302 is used to store the schemaful portion 106 of the identity information, while the schemaless database 304 is used to store the schemaless portion 108 of the identity information. By using the schemaful database 302 that is distinct from the schemaless database 304, the schemaful identity information can be separated from the schemaless identity information, and respective access engines (which can be part of the identity management engine 110-1) for the schemaful database 302 and schemaless database 304 can be used for accessing the content of the respective databases.

New fields can be added to the schemaless database 304, without having to change any schema associated with storing identity information of the identity management system 102. Also any existing field of the schemaless database 304 can be modified or deleted without having to change any schema associated with storing identity information of the identity management system 102.

Figure 4:
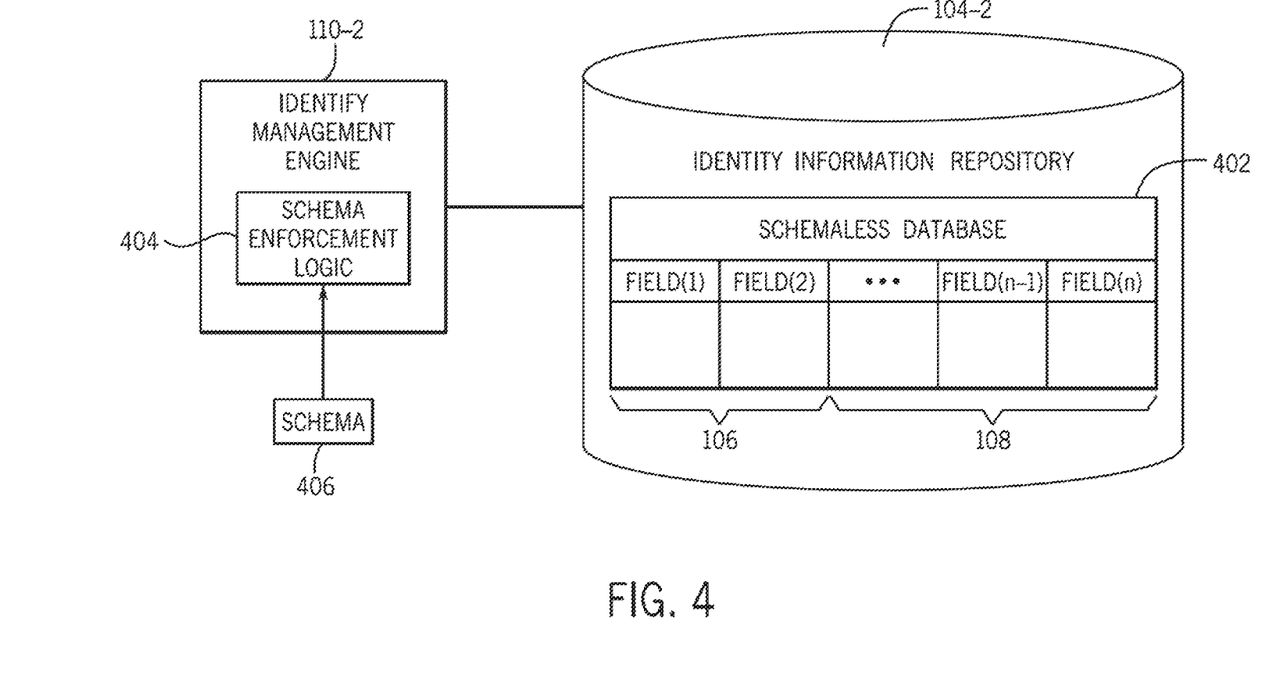

FIG. 4 shows an identity information repository 104-2 that can be accessed by an identity management engine 110-2 according to alternative implementations. The identity information repository 104-2 includes a schemaless database 402, but does not include a schemaful database. As shown in FIG. 4, the schemaless database 402 includes n (n>1) fields, such as field(1), field(2), . . . , field(n−1), field(n). Note that additional fields can be added to the schemaless database 402 in a dynamic manner.

Even though field(1) and field(2) are stored in the schemaless database 402, it is noted that field(1) and field(2) are part of the schemaful portion 106. In other words, the presence of field(1) and field(2) are according to a schema 406. The remaining fields of the schemaless database 402 can be part of the schemaless portion 108.

Presence of field(1) and field(2) in the schemaless database 402 is enforced using a schema enforcement logic 404, which can be part of the identity management engine 110-2, according to some examples. The schema enforcement logic 404 includes a portion of the identity management engine 110-2. The schema enforcement logic 404 uses the schema 406 to identify the fields of identity information that have to be present. The schema enforcement logic 404 uses the schema 406 to check the schemaless database 402 to ensure that the fields, including field(1) and field(2), according to the schema 406 are present in the schemaless database 402, and that such fields are consistent with the schema 406 (e.g. the fields are in a correct order, the fields contain valid values, etc.). The schema enforcement logic 404 is thus able to emulate storage of the schemaful portion 106 in the schemaless database 402.

Figure 5:
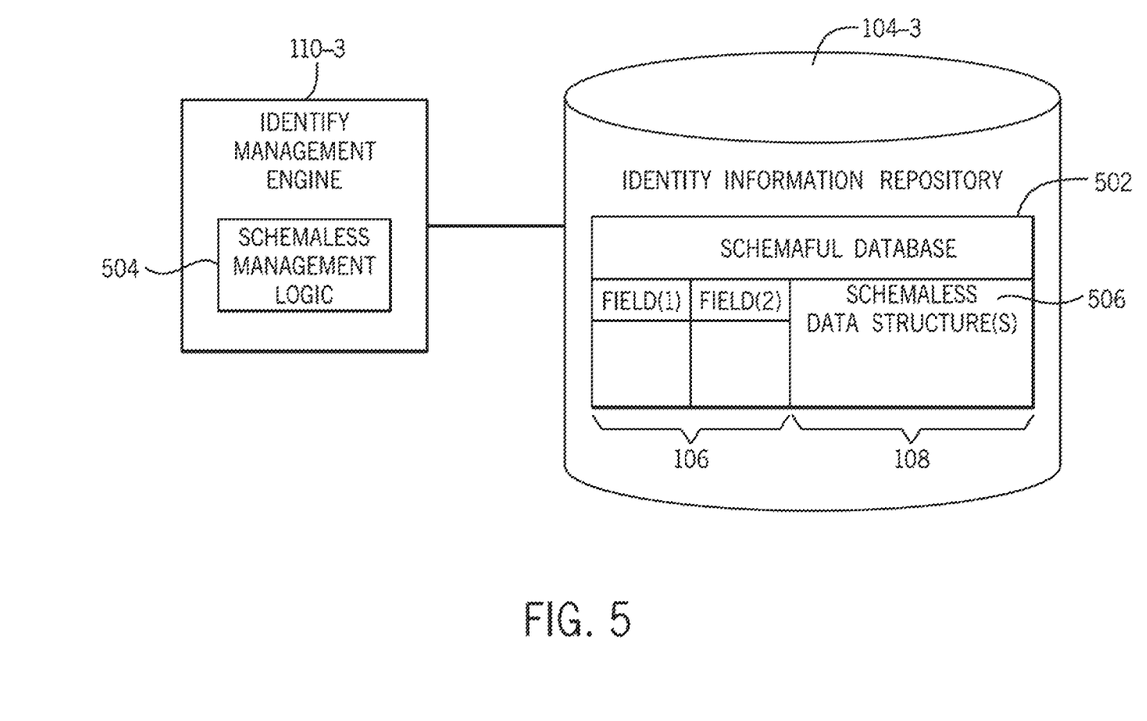

FIG. 5 shows another identity information repository 104-3 which can be accessed by an identity management engine 110-3 according to further implementations. The identity information repository 104-3 includes a schemaful database 502, but does not include a schemaless database. The schemaful database 502 stores various fields, including field(1) and field(2), according to a schema for the schemaful database 502. Field(1) and field(2) can be part of the schemaful portion 106. The schemaful database 502 also includes various fields that are part of the schemaless portion 106. The schemaless portion 106 can be implemented using schemaless data structure(s) 506 in one or multiple fields of the schemaful database 502.

In some implementations, schemaful fields of the schemaful database 502 that can store relatively large amounts of text or binary data are used to contain the schemaless data structure(s) 506. The schemaless data structure(s) 506 can be according to a specified format, such as a key-value map. When a schemaless portion of a record is retrieved, then this key-value map is loaded, parsed by a parsing engine, and the relevant information is extracted (if present) and returned. Possible implementations of such the schemaless data structure hashmaps that are serialized into a JavaScript Object Notation (JSON) or Extensible Markup Language (XML) text representation, or into a binary representation, depending on the type of the field used in the schemaful database to store the schemaless data structure(s) 506.

The identity management engine 110-3 includes a schemaless management logic 504 that is able to access and update the schemaless data structure(s) 506 in the schemaful database 502. The schemaless management logic 504 is thus able to emulate storage of the schemaless portion 106 in the schemaful database 502

Figure 6:
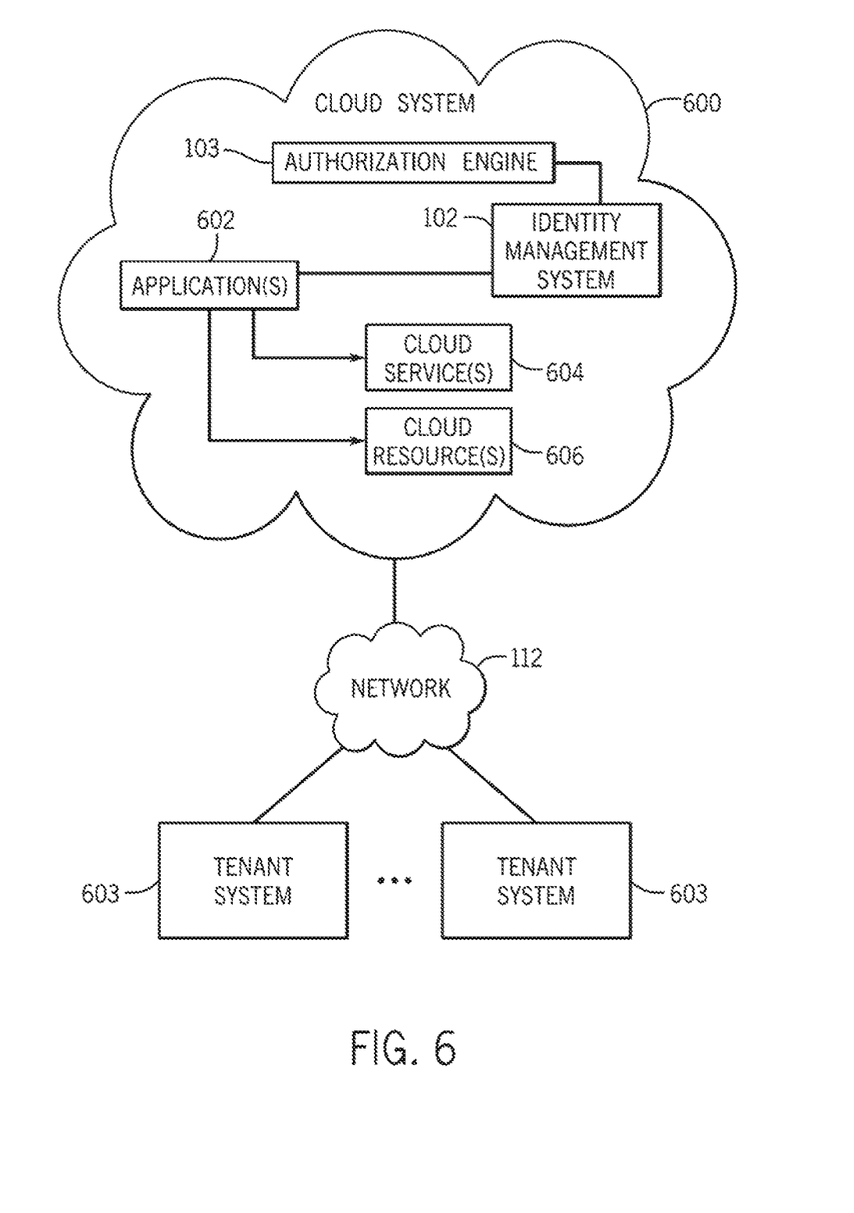
FIG. 6 is a block diagram of an example cloud system according to some implementations.

FIG. 6 is a block diagram of another example arrangement, which includes a cloud system 600 that is coupled over the network 112 to various tenant systems 603. The tenant systems 603 are associated with respective tenants of the cloud system 600. Each tenant system 603 can include one or multiple client devices 114 depicted in FIG. 1.

The cloud system 400 includes the authorization engine 103 and the identity management system 110 discussed in connection with FIG. 1 (variants of the identity management system 110 are described in connection with FIGS. 3-5). In addition, the cloud system 600 can include other entities for performing other actions using identity information of the identity management system 110. The cloud system 600 also includes one or multiple applications 602 that manage access to cloud service(s) 604 and cloud resource(s) 606. The cloud service(s) 604 and cloud resource(s) 606 can be accessed on demand by the tenant systems 603, by accessing the application(s) 602.

Figure 7:
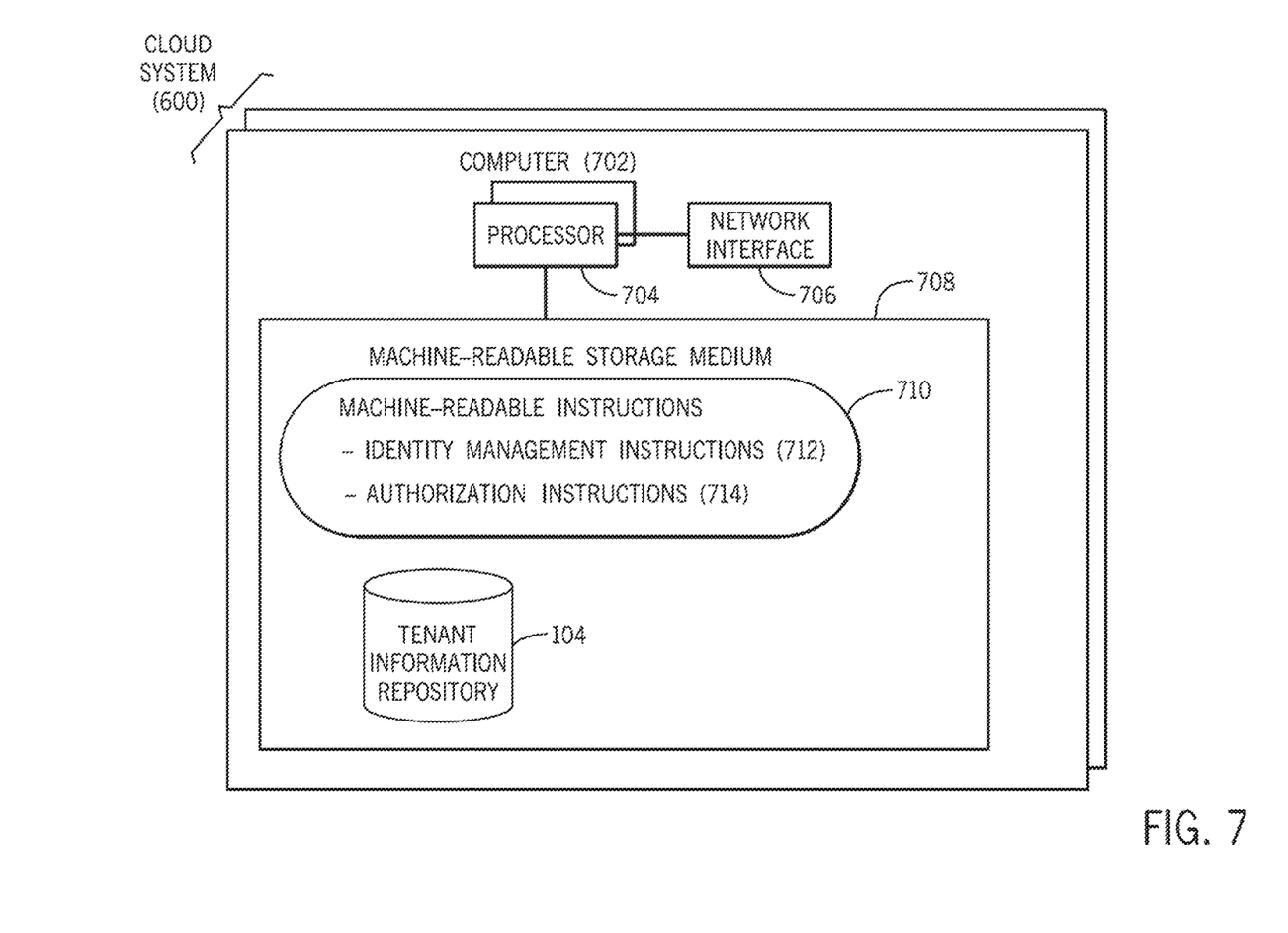
FIG. 7 is a block diagram of an example cloud system according to some implementations.

FIG. 7 is a block diagram of an example cloud system 600 that includes one or multiple computers 702, according to some implementations. Each computer 702 includes one or multiple processors 704, which can be connected to a network interface 706 to allow the computer 702 to communicate over a data network.

The processor(s) 704 can be coupled to a non-transitory machine-readable storage medium (or storage media) 708, which can store instructions and other information. The instructions can include machine-readable instructions 710, which can include identity management instructions 712 (that are part of the identity management engine 110 of FIG. 1) and authorization instructions 714 (that are part of the authorization engine 103 of FIG. 1). The machine-readable instructions 710 are executable on the processor(s) 704. A processor can include a microprocessor, microcontroller, processor module or subsystem, programmable integrated circuit, programmable gate array, or another control or computing device.

The storage medium (or storage media) 708 can also store the identity information repository 104 discussed above. As used herein, a "machine-readable storage medium" may be any electronic, magnetic, optical, or other physical storage apparatus to contain or store information such as, executable instructions, data, and the like. For example, any machine-readable storage medium described herein may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a system including a processor, a request of a user;
searching, by the system in response to the request, identity information for a plurality of users to retrieve a portion of the identity information corresponding to the user, the identity information including fields, wherein a first subset of the fields is schemaless, and a second subset of the fields is interpreted according to a specified schema, and wherein searching the identity information comprises searching the first subset and the second subset of fields;
authenticating the request from the user by providing, by the system, the identity information from the first subset to an authenticating engine, wherein the identity information from the first subset is third party identity information;
authorizing, by the system, an action for the request based on information from one field included in the first subset provided in the retrieved portion of the identity information; and
adding, by the system, a new field that includes the third party identity information from the first subset which is determined based on a key-value map, wherein the key value-map identifies structure of schemaless data structures and the processor extracts the schemaless data based on the key-value map; and
maintaining the specified schema of the second subset without changing identity information associated with the specified schema.

2. The method of claim 1, further comprising a further action using identity information from a second subset of the fields.

3. The method of claim 1, wherein the identity information is stored in a schemaless database, and wherein interpreting the second subset of fields according to the specified schema uses logic that enforces presence of the second subset of the fields according to the specified schema in the schemaless database.

4. The method of claim 1, wherein the identity information is stored in a schemaful database, and wherein one data structure in the schemaful database is used to store the first subset of the fields.

5. The method of claim 4, wherein the one data structure is in one field of the schemaful database.

6. The method of claim 1, further comprising:
storing the first subset of the fields in the schemaless database; and
storing the second subset of the fields in the schemaful database.

7. The method of claim 1, further comprising:
generating an index using field from the first and second subsets of fields, wherein searching the identity information uses the index.

8. The method of claim 1, further comprising:
dynamically removing an existing field of the first subset of the fields in the identity information.

9. The method of claim 1, further comprising:
dynamically modifying an existing field of the first subset of the fields in the identity information.

10. A system comprising:
a storage medium to store a semi-schemaless identity information repository that stores identity information for users, the identity information including fields, wherein a first subset of the fields is schemaless, and a second subset of the fields is interpreted according to a specified schema; and
a processor to:
in response to a request of a user, search the semi-schemaless identity information repository to retrieve a portion of the identity information corresponding to the user, wherein searching the semi-schemaless identity information repository comprises:
searching the first subset and the second subset of fields; and
authenticating the request from the user by providing the identity information from the first subset to an authenticating engine, wherein the identity information from the first subset is third party identity information;
provide information from one field of the first subset included in the retrieved portion of the identity information for use in authorizing an action for the request; and
add, by the system, a new field that includes the third party identity information from the first subset which is determined based on a key-value map, wherein the key value-map identifies structure of schemaless data structures and the processor extracts the schemaless data based on the key-value map; and
maintain the specified schema of the second subset without changing identity information associated with the specified schema.

11. The system of claim 10, wherein the the processor is to further provide information included in one field of the second subset included in the retrieved portion of the identity information for use in authorizing the action for the request.

12. The system of claim 10, wherein the semi-schemaless identity information repository includes a schemaless database containing the second subset of the fields, and wherein the processor is to further:

emulate storage of the second subset of the fields according to the specified schema.

13. The system of claim 10, wherein the semi-schemaless identity information repository includes a schemaful database containing the first subset of the fields, and wherein the processor is to further:
emulate storage of the first subset of the fields in a schemaless manner.

14. An article comprising a non-transitory machine-readable storage medium storing instructions that upon execution cause a processor to:
receive a request of a user to access a cloud resource or cloud service of a cloud system;
search identity information, in response to the request, for a plurality of users to retrieve a portion of the identity information corresponding to the user, the identity information including fields, wherein a first subset of the fields is schemaless, and a second subset of the fields is interpreted according to a specified schema, and wherein searching the identity information comprises:
searching the first subset and the second subset of fields; and
authenticating the request from the user by providing the identity information from the first subset to an authenticating engine, wherein the new field includes the third party identity information from the first subset;
provide information from one field of the first subset included in the retrieved portion of the identity information for authorizing access of the cloud resource or cloud service for the request;
add a new field that includes the third party identity information from the first subset which is determined based on a key-value map, wherein the key value-map identifies structure of schemaless data structures and the processor extracts the schemaless data based on the key-value map; and
maintain the specified schema of the second subset without changing identity information associated with the specified schema.

* * * * *